(12) United States Patent
Li et al.

(10) Patent No.: US 10,282,381 B2
(45) Date of Patent: May 7, 2019

(54) METHOD AND APPARATUS FOR DISCOVERING CLOSELY RELATED USER

(71) Applicant: Huawei Technologies Co., Ltd., Shenzhen, Guangdong (CN)

(72) Inventors: Huafei Li, Shenzhen (CN); Yibo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 300 days.

(21) Appl. No.: 15/195,928

(22) Filed: Jun. 28, 2016

(65) Prior Publication Data
US 2016/0306891 A1 Oct. 20, 2016

Related U.S. Application Data

(63) Continuation of application No. PCT/CN2014/095418, filed on Dec. 29, 2014.

(30) Foreign Application Priority Data

Dec. 31, 2013 (CN) .......................... 2013 1 0754230

(51) Int. Cl.
*G06F 17/30* (2006.01)
*G06F 16/9535* (2019.01)
(Continued)

(52) U.S. Cl.
CPC .... *G06F 16/9535* (2019.01); *G06F 16/24578* (2019.01); *G06Q 50/01* (2013.01); *H04L 67/22* (2013.01)

(58) Field of Classification Search
CPC .......... G06F 17/30867; G06F 16/9535; G06F 16/24578
(Continued)

(56) References Cited

U.S. PATENT DOCUMENTS 7,451,161 B2 11/2008 Zhu et al.
2005/0117793 A1 6/2005 Engelbart et al.
(Continued)

FOREIGN PATENT DOCUMENTS

CN 1758248 A 4/2006
CN 101446961 A 6/2009
(Continued)

OTHER PUBLICATIONS

Matthew A. Russ, "Data mining and analysis of social networking sites", Mechanical Industry Press, May 31, 2012, 3 pages.
(Continued)

*Primary Examiner* — Joshua Bullock

(57) ABSTRACT

Embodiments of the present invention provide a method and an apparatus for discovering a closely related user. The method includes: acquiring first data of a first user on social media and second data of a second user on the social media, where the second user is a user following the first user and/or a user followed by the first user; then, establishing a user model of the first user according to the first data and the second data; then, acquiring third data of a third user in social media, where the third user and the first user do not follow each other; afterward, performing matching between the third data and the user model to perform calculation, to obtain a matching result; and finally, if the matching result is greater than a preset value, determining that the third user is a closely related user of the first user.

9 Claims, 1 Drawing Sheet

(51) Int. Cl.
  *G06F 16/2457* (2019.01)
  *G06Q 50/00* (2012.01)
  *H04L 29/08* (2006.01)

(58) Field of Classification Search
  USPC .......................................................... 707/734
  See application file for complete search history.

(56) References Cited

U.S. PATENT DOCUMENTS

| | | | |
|---|---|---|---|
| 2006/0074883 A1* | 4/2006 | Teevan | G06F 17/30867 |
| 2011/0238701 A1 | 9/2011 | Liang et al. | |
| 2013/0054699 A1 | 2/2013 | Macaskill | |
| 2015/0215421 A1 | 7/2015 | Wei | |

FOREIGN PATENT DOCUMENTS

| | | |
|---|---|---|
| CN | 102281207 A | 12/2011 |
| CN | 102467542 A | 5/2012 |
| CN | 102831202 A | 12/2012 |
| CN | 103024017 A | 4/2013 |
| CN | 103034774 A | 4/2013 |
| CN | 103383703 A | 11/2013 |

OTHER PUBLICATIONS

Zhou Yipeng, "Software Human Theme Analysis and Information Retrieval Technology", Beijing University of Posts and Telecommunications Press, Aug. 31, 2012, 3 pages.

\* cited by examiner

METHOD AND APPARATUS FOR DISCOVERING CLOSELY RELATED USER

CROSS-REFERENCE TO RELATED APPLICATIONS

This application is a continuation of International Application No. PCT/CN2014/095418, filed on Dec. 29, 2014, which claims priority to Chinese Patent Application No. 201310754230.2, filed on Dec. 31, 2013, both of which are hereby incorporated by reference in their entireties.

TECHNICAL FIELD

The present invention relates to the field of computer technologies, and in particular, to a method and an apparatus for discovering a closely related user.

BACKGROUND

With rapid development of social media (Social Media), media from which a user acquires information change from traditional news websites to social media, where social media refer to websites and technologies that allow people to write, share, comment, have discussions, and communicate with each other.

Generally, a user acquires, from a closely related user such as a friend, a celebrity, an official microblog account, or an online community followed by the user on social media, information published by the closely related user. In the prior art, a closely related user is preset, and a closely related user is recommended to a user according to behavior of the user, for example, browsing information of the user on social media.

However, in the prior art, a closely related user is relatively fixed because the closely related user is preset, and it is rather difficult to discover a new closely related user. Therefore, a recommended closely related user is not suitable for the user.

SUMMARY

Embodiments of the present invention provide a method and an apparatus for discovering a closely related user, which are used to recommend a suitable closely related user to a user.

According to a first aspect, an embodiment of the present invention provides a method for discovering a closely related user, including:

acquiring first data of a first user on social media and second data of a second user on the social media, where the first data includes first description data and first access data of the first user on the social media, the second data includes second description data and second access data of the second user on the social media, and the second user is a user following the first user and/or a user followed by the first user;

establishing a user model of the first user according to the first data and the second data;

acquiring third data of a third user on the social media, where the third data includes third description data and third access data of the third user on the social media, and the third user and the first user do not follow each other;

performing matching between the third data and the user model to perform calculation, to obtain a matching result; and if the matching result is greater than a preset value, determining that the third user is a closely related user of the first user.

In a first possible implementation manner, the performing matching between the third data and the user model to perform calculation, to obtain a matching result includes:

performing matching between the third data and the user model, to obtain successfully matched items; and performing weighted summation calculation on the successfully matched items, to obtain the matching result.

With reference to the first aspect or the first possible implementation manner of the first aspect, in a second possible implementation manner, before the acquiring third data of a third user on the social media, the method further includes:

determining the third user by centering on the first user and according to a following relationship and a breadth-first principle.

With reference to the second possible implementation manner of the first aspect, in a third possible implementation manner, after the determining that the third user is a closely related user of the first user, the method further includes:

adding, as training data, the third data to the user model.

According to a second aspect, an embodiment of the present invention provides an apparatus for discovering a closely related user, including:

an acquiring module, configured to acquire first data of a first user on social media and second data of a second user on the social media, where the first data includes first description data and first access data of the first user on the social media, the second data includes second description data and second access data of the second user on the social media, and the second user is a user following the first user and/or a user followed by the first user;

an establishment module, configured to establish a user model of the first user according to the first data and the second data, where the acquiring module is further configured to acquire third data of a third user on the social media, where the third data includes third description data and third access data of the third user on the social media, and the third user and the first user do not follow each other;

a matching module, configured to perform matching between the third data and the user model to perform calculation, to obtain a matching result; and a determining module, configured to: if the matching result is greater than a preset value, determine that the third user is a closely related user of the first user.

In a first possible implementation manner, the matching module is specifically configured to perform matching between the third data and the user model, to obtain successfully matched items, and perform weighted summation calculation on the successfully matched items, to obtain the matching result.

With reference to the second aspect or the first possible implementation manner of the second aspect, in a second possible implementation manner, the determining module is further configured to determine the third user by centering on the first user and according to a following relationship and a breadth-first principle.

With reference to the second possible implementation manner of the second aspect, in a third possible implementation manner, the establishment module is further configured to add, as training data, the third data to the user model.

In the method and the apparatus for discovering a closely related user provided in the embodiments of the present invention, first data of a first user on social media and second data of a second user on the social media are first acquired, where the first data includes first description data and first access data of the first user on the social media, the second data includes second description data and second access data of the second user on the social media, and the second user is a user following the first user and/or a user followed by the first user; then, a user model of the first user is established according to the first data and the second data; then, third data of a third user on the social media is acquired, where the third data includes third description data and third access data of the third user on the social media, and the third user and the first user do not follow each other; afterward, matching is performed between the third data and the user model to perform calculation, to obtain a matching result; and finally, if the matching result is greater than a preset value, it is determined that the third user is a closely related user of the first user. In this way, it is implemented that a suitable closely related user is recommended to the first user.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
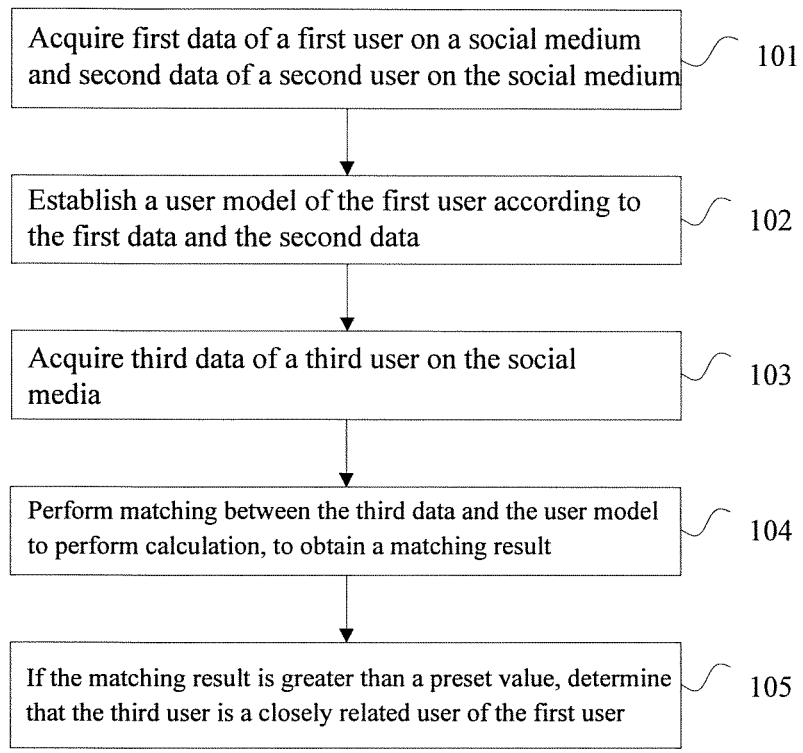
FIG. 1 is a flowchart of a method for discovering a closely related user according to an embodiment of the present invention.

FIG. 1 is a flowchart of a method for discovering a closely related user according to an embodiment of the present invention. As shown in FIG. 1, the method for discovering a closely related user provided in this embodiment includes:

Step 101: Acquire first data of a first user on social media and second data of a second user on the social media.

In this embodiment of the present invention, the first data includes first description data and first access data of the first user on the social media. For example, the first description data may be self-introduction of the first user on the social media, and the first access data may be released data, re-posted data, commented data, or collected data of the first user.

The second data in this embodiment may include second description data and second access data of the second user on the social media. For example, the second description data may be self-introduction of the second user on the social media, and the second access data may be released data, re-posted data, commented data, or collected data of the second user.

It should be noted that the second user is a user following the first user and/or a user followed by the first user.

Step 102: Establish a user model of the first user according to the first data and the second data.

Specifically, the user model of the first user is established according to the first data and the second data by using a method of machine learning. For example, the user model of the first user is established according to a topic prompt, content of a hyperlink, and an emoticon in the first data and according to a topic prompt, content of a hyperlink, and an emoticon in the second data as well as a correlation between the first user and the second user.

Step 103: Acquire third data of a third user on the social media.

In this embodiment, the third data includes description data and access data of the third user on the social media, and the third user and the first user do not follow each other. The third description data may be self-introduction of the third user on the social media, and the third access data may be released data, re-posted data, commented data, or collected data of the third user.

Step 104: Perform matching between the third data and the user model to perform calculation, to obtain a matching result.

Specifically, the third data is matched with the foregoing user model, to obtain successfully matched items, and then, weighted summation calculation is performed on the successfully matched items, to obtain the matching result.

It should be noted that the user model includes a positive example and a negative example, and each of the positive example and the negative example includes multiple pieces of data, where the positive example may be construed as data related to the first user, and the negative example may be construed as data unrelated to the first user. In addition, different weight values are correspondingly set for different data in each positive example and different data in each negative example separately.

Further, on the basis of the foregoing embodiment, a characteristic of the third data may be first extracted, to obtain a characteristic value; then, matching between the characteristic value and the foregoing user model is performed, to obtain successfully matched items; afterward, weighted summation calculation is performed on the successfully matched items, to obtain the matching result.

Step 105: If the matching result is greater than a preset value, determine that the third user is a closely related user of the first user.

In this embodiment, the preset value is not limited, and the preset value may be set by persons skilled in the art according to an actual situation.

In the method for discovering a closely related user provided in this embodiment, first data of a first user on social media and second data of a second user on the social media are first acquired, where the first data includes first description data and first access data of the first user on the social media, the second data includes second description data and second access data of the second user on the social media, and the second user is a user following the first user and/or a user followed by the first user; then, a user model of the first user is established according to the first data and the second data; and then, third data of a third user on the social media is acquired, where the third data includes third description data and third access data of the third user on the social media, and the third user and the first user do not follow each other; afterward, matching is performed between the third data and the user model to perform calculation, to obtain a matching result; and finally, if the matching result is greater than a preset value, it is determined that the third user is a closely related user of the first user. In this way, it is implemented that a suitable closely related user is recommended to the first user.

Further, on the basis of the foregoing embodiment, before the acquiring third data of a third user on the social media, the method may further include:

determining the third user by centering on the first user and according to a following relationship and a breadth-first principle.

Further, on the basis of the foregoing embodiment, after the determining that the third user is a closely related user of the first user, the method may further include:

adding, as training data, the third data to the user model.

In this embodiment, the third data is added to the user model, and in this way, the user model may be trained. Further, the third data whose matching result is greater than the preset value may be continuously added to the user model, so as to amend the user model in this iterative manner. In this way, a suitable closely related user may be provided to the first user. It should be noted that the training data includes a positive example and a negative example of the user model.

Figure 2:
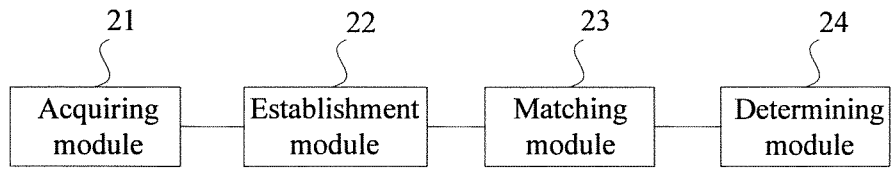
FIG. 2 is a schematic structural diagram of an apparatus for discovering a closely related user according to an embodiment of the present invention.

FIG. 2 is a schematic structural diagram of an apparatus for discovering a closely related user according to an embodiment of the present invention. As shown in FIG. 2, the apparatus for discovering a closely related user provided in this embodiment includes: an acquiring module 21, an establishment module 22, a matching module 23, and a determining module 24.

The acquiring module 21 is configured to acquire first data of a first user on social media and second data of a second user on the social media, where the first data includes first description data and first access data of the first user on the social media, the second data includes second description data and second access data of the second user on the social media, and the second user is a user following the first user and/or a user followed by the first use.

The establishment module 22 is configured to establish a user model of the first user according to the first data and the second data, where the acquiring module 21 is further configured to acquire third data of a third user on the social media, where the third data includes third description data and third access data of the third user on the social media, and the third user and the first user do not follow each other.

The matching module 23 is configured to perform matching between the third data and the user model to perform calculation, to obtain a matching result; and the determining module 24 is configured to: if the matching result is greater than a preset value, determine that the third user is a closely related user of the first user.

In the apparatus for discovering a closely related user provided in this embodiment, first data of a first user on social media and second data of a second user on the social media are first acquired, where the first data includes first description data and first access data of the first user on the social media, the second data includes second description data and second access data of the second user on the social media, and the second user is a user following the first user and/or a user followed by the first user; then, a user model of the first user is established according to the first data and the second data; and then, third data of a third user on the social media is acquired, where the third data includes third description data and third access data of the third user on the social media, and the third user and the first user do not follow each other; afterward, matching is performed between the third data and the user model to perform calculation, to obtain a matching result; and finally, if the matching result is greater than a preset value, it is determined that the third user is a closely related user of the first user. In this way, it is implemented that a suitable closely related user is recommended to the first user.

On the basis of the foregoing embodiment, the matching module 23 is specifically configured to perform matching between the third data and the user model, to obtain successfully matched items, and perform weighted summation calculation on the successfully matched items, to obtain the matching result.

Further, on the basis of the foregoing embodiment, the determining module 24 is further configured to determine the third user by centering on the first user and according to a following relationship and a breadth-first principle.

The establishment module 22 is further configured to add, as training data, the third data to the user model.

In this embodiment, it is implemented that a suitable closely related user is recommended to the first user.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for discovering a closely related user, the method comprising:

acquiring first data of a first user on social media and second data of a second user on the social media, wherein the first data comprises first description data and first access data of the first user on the social media, the second data comprises second description data and second access data of the second user on the social media, and the second user is at least one of a user following the first user or a user followed by the first user;

establishing a user model of the first user according to the first data and the second data;

determining a third user by centering on the first user and according to a following relationship and a breadth-first principle;

acquiring third data of the third user on the social media, wherein the third data comprises third description data and third access data of the third user on the social media, and the third user and the first user do not follow each other;

performing matching between the third data and the user model to obtain a matching result; and if the matching result is greater than a preset value, determining that the third user is a closely related user of the first user.

2. The method according to claim 1, wherein performing matching between the third data and the user model to obtain a matching result comprises:
 performing matching between the third data and the user model, to obtain successfully matched items; and
 performing weighted summation calculation on the successfully matched items, to obtain the matching result.

3. The method according to claim 1, wherein after determining that the third user is a closely related user of the first user, the method further comprises:
 adding, as training data, the third data to the user model.

4. The method according to claim 1, wherein after determining that the third user is a closely related user of the first user, the method further comprises:
 recommending the third user to the first user as a suitable closely related user.

5. The method of claim 1, wherein:
 the first description data comprises a self-introduction of the first user on the social media; and
 the second description data comprises a self-introduction of the second user on the social media.

6. The method of claim 1, wherein establishing a user model of the first user according to the first data and the second data comprises:
 establishing the user model of the first user according to at least one of a topic prompt, content of a hyperlink, or an emoticon in the first data and according to at least one of a topic prompt, content of a hyperlink, or an emoticon in the second data.

7. An apparatus for discovering a closely related user, the apparatus comprising:
 an acquiring module, configured to:
  acquire first data of a first user on social media and second data of a second user on the social media, wherein the first data comprises first description data and first access data of the first user on the social media, the second data comprises second description data and second access data of the second user on the social media, and the second user is at least one of a user following the first user or a user followed by the first user, and
  acquire third data of a third user on the social media, wherein the third data comprises third description data and third access data of the third user on the social media, and the third user and the first user do not follow each other;
 an establishment module, configured to establish a user model of the first user according to the first data and the second data;
 a matching module, configured to perform matching between the third data and the user model to obtain a matching result; and
 a determining module, configured to:
  determine the third user by centering on the first user and according to a following relationship and a breadth-first principle, and
  if the matching result is greater than a preset value, determine that the third user is a closely related user of the first user.

8. The apparatus according to claim 7, wherein the matching module is configured to perform matching between the third data and the user model, to obtain successfully matched items, and perform weighted summation calculation on the successfully matched items, to obtain the matching result.

9. The apparatus according to claim 7, wherein the establishment module is further configured to add, as training data, the third data to the user model.

* * * * *